Dec. 21, 1948.　　　　F. M. DOMINIC　　　2,456,868
TRAILER FOR DISKING MACHINES
Filed Sept. 25, 1946　　　　　　　　　　2 Sheets-Sheet 1
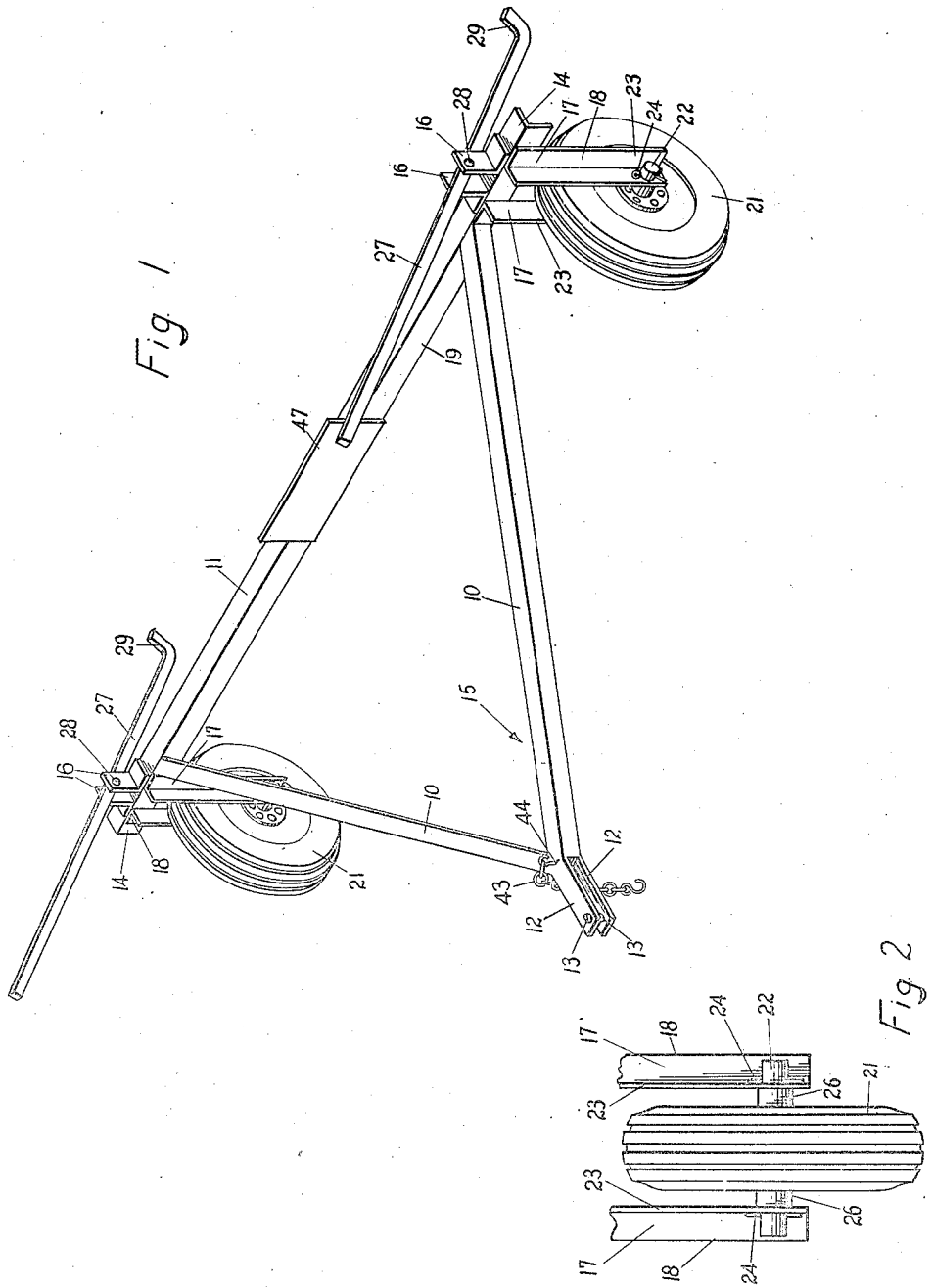

Dec. 21, 1948.    F. M. DOMINIC    2,456,868
TRAILER FOR DISKING MACHINES
Filed Sept. 25, 1946    2 Sheets—Sheet 2

INVENTOR
Frank Dominic
By Rudolph L. Lowell
Atty.

Patented Dec. 21, 1948

2,456,868

UNITED STATES PATENT OFFICE 2,456,868

TRAILER FOR DISKING MACHINES

Frank M. Dominic, Duncombe, Iowa

Application September 25, 1946, Serial No. 699,121

4 Claims. (Cl. 214—77)

This invention relates generally to vehicle trailers and in particular to a trailer for transporting a farm discing machine.

A large part of the discing machines now in common use on farms are of the type generally known as straight discs and usually include a series of discs rotatably supported in an axially spaced relation on a pair of transverse shafts arranged end to end. A draw frame, or tongue structure, is extended forwardly from the shafts and has its front end connectible with a tractor. The discs always rest on the ground surface so that in moving the discing machine from one field to another, and in particular where such movement requires travel along a highway, it is necessary that the discing machine be elevated on a trailer or wagon for transport purposes. It is thus readily apparent that the lifting of the discing machine on to a usual farm trailer or wagon is a difficult and hard task generally requiring the use of several men.

It is an object of this invention, therefore, to provide an improved trailer for a discing machine.

A further object of this invention is to provide a trailer for a disc which is of a construction such that the disc can be elevated to a supported position on the trailer by one man.

Yet another object of this invention is to provide a disc trailer of a compact and rugged construction, economical to manufacture, efficiently and easily operable to elevate and lower a disc therefrom, and readily converted for usual trailer use when not used as a disc trailer.

A feature of this invention is found in the provision of a trailer for a discing machine having a portable frame connectible at its front end with a tractor. Transversely spaced at the rear end of the frame is a pair of pivoted longitudinally extended lift members, pivotally supported intermediate their ends, for up and down pivotal movement, at positions above the level of a usual disc supporting shaft and having their rear end portions projected rearwardly from the trailer portable frame. The rear end portions are of a construction to receive and support the disc shaft thereon when in a pivotally lowered position and the portable frame is located below the usual forwardly extended frame of the discing machine. On a pivotal downward movement of the front ends of the lifting members to a lowered position, the discing machine is elevated to a carrying position on the trailer and then retained in such carrying position by releasably locking the front ends of the lift members against upward pivotal movement.

Further objects, features and advantages of this invention will become apparent from the following description when taken in connection with the accompanying drawings, in which:

Fig. 1 is a perspective view of the disc trailer of this invention;

Fig. 2 is a fragmentary front elevational view of a ground wheel assembly forming part of the trailer;

Figure 3:
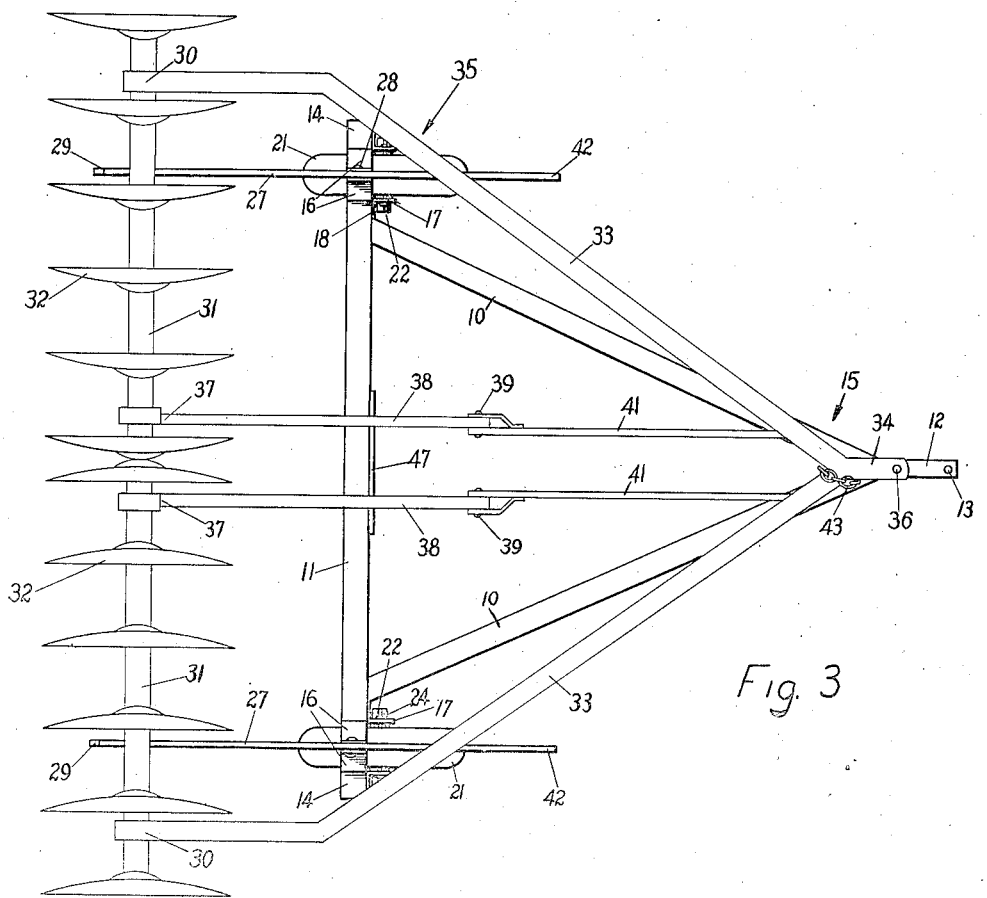
Fig. 3 is a top view of the trailer showing a discing machine in a supported position thereon.

With reference to the drawings, the trailer of this invention is illustrated in Fig. 1 as including a triangular shaped frame structure indicated generally as 15, having side members 10 and a base member 11 formed from angle iron material. Projected forwardly from the apex of the trailer frame 15 is a pair of vertically spaced tongue straps 12 having aligned openings 13 at their forward ends adapted to receive a usual hitch pin (not shown) to provide for the connection of the trailer with a tractor. The opposite ends 14 of the base member 11 project laterally outwardly from the side members 10 and carry pairs of transversely spaced upright supports 16 for a purpose which will appear later.

Extended downwardly from the base member ends 14 are pairs of transversely spaced wheel supports 17, of an angle iron construction, having one of their legs 18 welded or otherwise suitably secured to the vertically extended leg 19 of the base member 11. Each pair of the support members 17 are spaced a distance apart to receive therebetween a ground wheel 21 (Figs. 1 and 2) which is rotatably supported on a shaft 22 extended through the legs 23 of the supports 17 and adjacent to the lower ends of such supports. A shaft 22 is held against axial movement by cotter keys 24 extended therethrough and engageable with the outer sides of the legs 23, while a wheel 21 is maintained against axial movement by collar or spacer members 26 mounted on a shaft 22 between a wheel 21 and the inner sides of the legs 23.

A pair of longitudinally extended lift members 27 (Fig. 1) are pivotally supported intermediate their ends, for pivotal up and down movement, on pins 28 carried between the supports 16 at the base member ends 14. The rear end portions of the lift members 27 extend rearwardly from the base member 11 and are formed at their rear ends with upwardly extended hooks 29.

Figure 4:
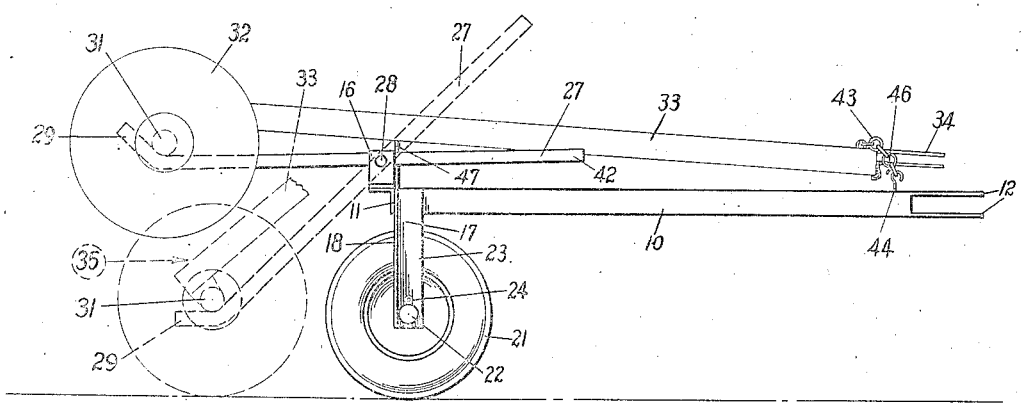
Fig. 4 is a side elevational view of the trailer and discing machine assembly shown in Fig. 3.

The trailer of this invention is particularly adapted for use with a discing machine of straight type which, as illustrated in Figs. 3 and 4, generally includes a pair of transverse disc supporting shafts 31 arranged end to end and carrying a series of axially spaced discs 32. The outer ends of the shafts 31 are rotatably supported in the rear ends 30 of a pair of side frame members 33 which form part of a discing machine frame structure, designated generally as 35. The forward ends of the frame members 33 are joined together in a substantially V-shape, with such junction being provided with a pair of vertically spaced tongue straps 34 having hitch pin receiving openings 36. The inner ends of the disc shaft 31 are rotatably carried at the rear ends 37 of longitudinally extended center support members 38 which have their forward ends pivoted at 39 to the rear ends of a pair of frame members 41 extended rearwardly fom the V connection of the side frame members 33.

In the use of the trailer of this invention, the trailer is backed up to a position below the forwardly extended frame 35 of the discing machine and the lift members 27 are moved to position the hooks 29 below the side shafts 31. This arrangement of the trailer is accomplished by tilting or raising the disc frame 35 upwardly and forwardly, as illustrated in dotted lines in Fig. 4. With the trailer thus positioned relative to the discing machine, the forward ends 42 of the lift members 27 are positioned below the side frame members 33 of the discing frame 35, as best appears in Fig. 3. As a result, when the front end of the discing machine frame 35 is pulled downwardly, the forward ends 42 of the lift members 27 are engaged and pivotally moved downwardly by the side frame members 33 to in turn provide for an upward pivotal movement of the hooks 29 at the rear ends of the lift members. On engagement of the hooks 29 with the disc shafts 31, the discing machine is fulcrumed on the pivots 28 for movement to a supported position on the trailer. As shown in Fig. 4, the pivots 28 for the lift members 27 are at a level above the ground higher than the level of the disc shafts 31. Because of this fact, when the disc frame 35 is in a substantially horizontal plane in a supported position on the trailer, the discs 32 are in substantial clearance with the ground.

The front ends 42 of the lifting members or arms 27 are held in their downwardly pivotally moved position, providing for an elevation of the discs 32 in a clearance relation with the ground, by the provision of a chain 43 attached at one end 44 to the apex end of the trailer frame 15 and looped over a side member 33 of the disc frame 35 for attachment of its free end with a link 46 in the chain loop, in a manner which is well known. The disc is thus positively supported and secured for transport on the trailer. To stabilize the disc in its supported position, an upright transversely extended plate member 47 is carried on the base member 11 intermediate its ends 14. The pivoted center supports 38 rest on the top side of the plate member 47 to support the inner ends of the discs shafts 31.

The disc is removed from the trailer by simply disconnecting the chain 43 and then permitting the discing machine to pivot about the pivots 28 until the discs 31 are in a supported position on the ground. The lift levers 27 are then manipulated to release their hook ends 29 from the disc shafts 31 and the trailer is pulled forwardly away from the discing machine.

From a consideration of the above description, it is seen that the invention provides a trailer for a discing machine which is of a simple and compact constructon, comprised of but a few number of parts, and operable by one man to easily and quickly load and unload a discing machine therefrom. Although the invention has been described with respect to the lifting members 27 being held in positions, providing for the elevation of the discs 32 in a ground clearance relation with the ground, by the engagement of their front ends 42 with the under side of the discing machine frame 35, it is readily apparent that other means, such as hooks or chains, may be carried on the trailer frame 15 for attachment with the front ends 42 of the lifting members 27. Further, the trailer is readily converted for usual trailer uses by merely removing the lifting members 27 and supporting a suitable trailer box or frame (not shown) on the trailer frame 15.

Although the invention has been described with respect to a preferred embodiment thereof, it is to be understood that it is not to be so limited since changes and modification can be made therein which are within the full intended scope of this invention, as defined by the appended claims.

I claim:

1. A trailer for a discing machine having a transverse disc supporting shaft and a frame extended forwardly therefrom, said trailer including a triangular frame structure connectible at its apex end with a tractor, ground wheels mounted at opposite ends of the base of said frame structure, a pair of transversely spaced longitudinally extended lifting levers pivotally supported intermediate their ends on the top of said base for up and down pivotal movement, and disc-shaft engaging and supporting members at the rear ends of said lifting levers, said lifting levers, on movement of said frame structure below said disc frame, being movable to positions such that said supporting members are below said disc shaft and the forward ends thereof are located below said disc frame, with said forward ends, on downward movement of the disc frame to a substantially superposed position on said frame structure, being engaged and moved by the disc frame to elevate said disc shaft, and means for holding said disc frame on said frame structure against upward movement.

2. A trailer for a farm disc having a disc shaft and a frame extended forwardly from said shaft, said trailer comprising a portable frame connectible at its front end with a tractor, a pair of transversely spaced longitudinally extended lifting members on the rear end of said portable frame, means pivotally supporting said lifting members intermediate their ends for up and down pivotal movement, with the rear end portions of said lifting members being extended rearwardly from said portable frame, and means at the rear ends of said lifting members for engaging and supporting said disc shaft, said last mentioned means, when said portable frame is positioned below said disc frame, being movable below said disc shaft, and the front end portions of said lifting members being of a length to extend below said disc frame, so that on downward movement of said disc frame to a supported position on said portable frame, said front end portions are engaged and moved downwardly by the disc frame to provide for the elevation of said disc shaft, and means for holding said disc frame on said portable frame against upward movement.

3. A trailer for a farm disc having a disc shaft and a frame extended forwardly from said disc shaft comprising, a substantially triangular frame connectible at its apex end with a tractor, ground wheels at the base of said portable frame, a pair of longitudinal lift members transversely spaced on said base, means on the top of said base pivotally supporting said lift members intermediate their ends for pivotal up and down movement, disc-shaft supporting members at the rear ends of said lift members, said lift members, when said trailer frame is below said disc frame and said supporting members are positioned below said disc shaft, having their forward end portions adapted to extend below said disc frame so that as said disc frame is moved downwardly on the top of said trailer frame, said forward end portions are engaged and moved downwardly to provide for the elevation of said disc shaft, and means for holding said disc frame on said trailer frame against upward movement.

4. A trailer for a farm disc having a disc supporting shaft and a frame extended forwardly from said disc shaft, including a portable frame, a pair of transversely spaced lifting members at the rear end of said portable frame, means pivotally supporting said lift members intermediate their ends for pivotal up and down movement, with said pivot means being arranged above the ground at a level higher than the level of said disc shaft, and the rear end portions of said lift members being extended rearwardly from said portable frame, means at the rear ends of said lifting members adapted to engage and support said disc shaft, with said lift members, when the portable frame is positioned below said disc frame, being movable to engaging positions with said disc shaft so that on pivotal movement of the lever front end portions to downwardly moved positions therefor, said disc shaft is elevated to substantially the level of said pivotal supporting means, and means for holding said lift members in said downwardly moved positions therefor.

FRANK M. DOMINIC.

REFERENCES CITED

The following references are of record in the file of this patent:

UNITED STATES PATENTS

| Number | Name | Date |
|---|---|---|
| 799,414 | Steele | Sept. 12, 1905 |
| 901,252 | McLeran | Oct. 13, 1908 |
| 1,003,648 | Platt et al. | Sept. 19, 1911 |
| 1,619,904 | Wenndt | Mar. 8, 1927 |
| 2,164,550 | Steward | July 4, 1939 |
| 2,233,005 | Garlinghouse | Feb. 25, 1941 |
| 2,233,697 | Freitag | Mar. 4, 1941 |